(12) United States Patent
Mikula (10) Patent No.: US 9,073,678 B2
(45) Date of Patent: Jul. 7, 2015

(54) COLD COHESIVE PACKAGING SYSTEM USING TEAR RESISTANT TAPE

(71) Applicant: Shane Mikula, Naperville, IL (US)

(72) Inventor: Shane Mikula, Naperville, IL (US)

( * ) Notice: Subject to any disclaimer, the term of this patent is extended or adjusted under 35 U.S.C. 154(b) by 0 days.

(21) Appl. No.: 13/692,708

(22) Filed: Dec. 3, 2012

(65) Prior Publication Data

US 2013/0341232 A1    Dec. 26, 2013

Related U.S. Application Data

(60) Provisional application No. 61/636,210, filed on Apr. 20, 2012, provisional application No. 61/636,226, filed on Apr. 20, 2012, provisional application No. 61/636,233, filed on Apr. 20, 2012.

(51) Int. Cl.
| | |
|---|---|
| *B65D 75/36* | (2006.01) |
| *B65D 75/32* | (2006.01) |
| *C09J 5/02* | (2006.01) |
| *C09J 121/02* | (2006.01) |
| *B65D 73/00* | (2006.01) |
| *B32B 38/00* | (2006.01) |
| *C09J 107/02* | (2006.01) |
| *C09J 5/04* | (2006.01) |

(52) U.S. Cl.
CPC ............ *B65D 73/00* (2013.01); *B32B 38/0012* (2013.01); *Y10T 156/1051* (2015.01); *C09J 107/02* (2013.01); *C09J 121/02* (2013.01); *B65D 75/366* (2013.01); *C09J 5/04* (2013.01)

(58) Field of Classification Search
USPC .......................................... 206/461, 462, 530
See application file for complete search history.

(56) References Cited

U.S. PATENT DOCUMENTS

| | | | |
|---|---|---|---|
| 2,637,251 A | 5/1953 | Spiess | |
| 3,224,159 A | 12/1965 | Pitt et al. | |
| 3,924,747 A | 12/1975 | Gerner | |
| 4,430,843 A | 2/1984 | Favale | |
| 5,014,851 A | 5/1991 | Wick | |
| 5,704,481 A | 1/1998 | Lutz | |
| 6,085,904 A | 7/2000 | Perdue, Jr. | |
| 6,126,584 A | 10/2000 | Zadravetz | |
| 6,308,832 B1 | 10/2001 | Pirro et al. | |
| 6,719,139 B1 | 4/2004 | Foos et al. | |
| 6,736,267 B2 | 5/2004 | Schamante | |
| 7,207,441 B2 * | 4/2007 | Ritter ............................ | 206/470 |

(Continued)

FOREIGN PATENT DOCUMENTS

| | | |
|---|---|---|
| GB | 1142773 | 2/1969 |
| WO | WO97/05038 | 2/1997 |

*Primary Examiner* — Mickey Yu
*Assistant Examiner* — Allan Stevens
(74) *Attorney, Agent, or Firm* — Ice Miller LLP (57) ABSTRACT

According to one aspect of the present disclosure, a cold cohesive packaging system using tear resistant tape includes a top sheet having an interior surface and at least one top cohesive region defined on the interior surface; a bottom sheet having a bottom interior surface and at least one bottom cohesive region defined on the bottom interior surface; at least one strip embedded in the top sheet or the bottom sheet, the at least one strip being resistant to tearing; and a cohesive, wherein the cohesive is applied in liquid form and adheres as a film to the at least one top cohesive region and the at least one bottom cohesive region, where the cohesive is capable of permanently bonding the top sheet to the bottom sheet when a pressure is applied, and wherein the cohesive comprises a latex-based cohesive with a viscosity of no more than 450 centipoise.

15 Claims, 6 Drawing Sheets

(56) References Cited

U.S. PATENT DOCUMENTS

| | | |
|---|---|---|
| 7,681,733 B2 | 3/2010 | Grosskopf |
| 7,726,480 B2 | 6/2010 | Nazari |
| 8,205,746 B2 | 6/2012 | Nazari |
| 8,205,747 B2 | 6/2012 | Nazari |
| 8,616,372 B2 | 12/2013 | Wills |
| 2005/0196630 A1 | 9/2005 | Carper |
| 2006/0028014 A1 | 2/2006 | McQueeny et al. |
| 2006/0207909 A1 | 9/2006 | Tada et al. |
| 2007/0187264 A1 | 8/2007 | Hofte et al. |
| 2007/0209957 A1 | 9/2007 | Glenn et al. |
| 2008/0029417 A1 | 2/2008 | Begim |
| 2009/0101534 A1* | 4/2009 | Wills .......................... 206/462 |
| 2010/0105534 A1 | 4/2010 | Nazari |
| 2010/0170821 A1 | 7/2010 | Grosskopf |
| 2010/0230315 A1 | 9/2010 | Nazari |
| 2010/0236723 A1 | 9/2010 | Nazari |
| 2012/0228178 A1 | 9/2012 | Nazari |

* cited by examiner

AMENDED FIG. 4

COLD COHESIVE PACKAGING SYSTEM USING TEAR RESISTANT TAPE

PRIORITY

This application is related to, and claims the priority benefit of, U.S. Provisional Application Ser. Nos. 61/636,210 filed on Apr. 20, 2012, 61/636,226 filed on Apr. 20, 2012, and 61/636,233 filed on Apr. 20, 2012, the entire contents of which are incorporated herein by reference.

BACKGROUND

Conventional packaging for the retail sale of consumer products has evolved to include display packs that not only allow unobstructed viewing of a product without opening the packaging, but also prevent tampering with the product, deter theft of the product, and limit retailer costs from unsaleable product due only to damaged packaging. Among the types of consumer packaging developed to address these needs is a clear plastic blister pack in combination with a cardboard, corrugated fiberboard, or paperboard frame that encloses the outer edges of the blister pack. The product is enclosed inside the blister pack, and the combination of the blister pack and the corrugated frame prevents easy access to the product. This type of packaging deters theft by providing a bulky package and provides a protective shield to the enclosed product while still allowing a consumer to view the product.

Traditionally, the corrugated frame used in combination with plastic blister pack is made up of two sheets of material adhered together with an adhesive, such as a hot melt glue, a heat-sensitive adhesive, or a cohesive contact adhesive. However, these adhesives and their respective application processes have several disadvantages. For instance, hot melt glues are typically difficult to apply in a controlled fashion, and the quality of the resulting seal varies accordingly. Heat-sensitive adhesives often provide ineffective seals when used with corrugated substrates because the corrugated sheets are poor heat conductors. Such adhesives are also difficult to use in a high volume manufacturing process where corrugated frames must be stacked in an efficient manner because the adhesive is slow to dry and is also susceptible to smearing when coming into contact with another surface. Furthermore, as the corrugated frames are stacked higher and higher, the accumulation of weight in the stack increases the possibility of the frames adhering to each other once the adhesive has been applied. Finally, conventional cohesive contact adhesives also suffer from these and other drawbacks in that they are applied over the entire interior surface of the corrugated packaging, creating waste, slowing the production process, and inevitably leaving an undesirable adhesive residue on the plastic blister pack that impacts the recyclability of the blister pack when separated from the corrugated frame.

The abovementioned conventional adhesives create excess waste both during the manufacturing process and once the product is removed from the packaging by a consumer. In recent years, there has also been an increased awareness of the environmental impact from the manufacture, use and disposal of product packaging. While both the plastic blister pack and corrugated frame used in conventional packaging are separately recyclable, the adhesive is not and can impact the recyclability of the rest of the packaging. It is therefore desirable to use an adhesive that causes minimal environmental impact when disposed.

In addition, another disadvantage of conventional packaging using a corrugated frame is that the frame is susceptible to being torn open by hand, particularly in the direction of the corrugations. Corrugated sheets are known to provide strength and resist bending in the direction parallel the corrugations. However, corrugated sheets are particularly susceptible to being torn in the direction parallel the corrugations. Conversely, corrugated sheets are not as strong with respect to bending in the direction transverse to the corrugations but do provide some resistance to being torn transverse the corrugations. Further, corrugated display packaging generally includes frame sheets in which the corrugations are oriented vertically to facilitate standing the package on end upon a retail store shelf for display. However, orienting the corrugations in one direction for strength also leaves the packaging vulnerable to being torn by hand along that same direction by potential shoplifters.

Accordingly, a need exists for a combination plastic blister pack and corrugated product packaging container that is cost-effective to produce, environmentally friendly to manufacture and dispose, sufficiently protects a product during shipping, handling, and display, and is resistant to being torn open by hand in any given direction.

SUMMARY

According to one aspect of the present disclosure, a cold cohesive packaging system using tear resistant tape is disclosed. A cold seal cohesive packaging system includes a top sheet having a top interior surface, an opposing top exterior surface, and at least one top cohesive region defined on the top interior surface; a bottom sheet having a bottom interior surface, an opposing bottom exterior surface, and at least one bottom cohesive region defined on the bottom interior surface; and a cohesive, wherein the cohesive is applied in liquid form and adheres as a film to the at least one top cohesive region and the at least one bottom cohesive region, wherein the cohesive is capable of permanently bonding the top sheet to the bottom sheet when the at least one top cohesive region at least partially contacts the at least one bottom cohesive region and a pressure is applied substantially simultaneously to both the top exterior surface opposite the at least one top cohesive region and to the bottom exterior surface opposite the at least one bottom cohesive region, and wherein the cohesive comprises a latex-based cohesive with a viscosity of no more than 450 centipoise, which once dried is cohesive only to itself and is lacks tackiness. In at least one embodiment according to the present disclosure, the system further includes at least one strip embedded in the top sheet or the bottom sheet, the at least one strip being resistant to tearing. In at least one embodiment according to the present disclosure, the at least one strip is disposed adjacent an edge of the top sheet or an edge the bottom sheet.

In at least one embodiment according to the present disclosure, the top sheet further comprises a corrugated layer having corrugations, and the at least one strip extends transversely across the corrugations of the top sheet, and wherein the bottom sheet further comprises a corrugated layer having corrugations, and the at least one strip extends transversely across the corrugations of the bottom sheet. In at least one embodiment according to the present disclosure, the corrugations of the top sheet are oriented perpendicular to the corrugations of the bottom sheet when the top sheet and bottom sheet are bonded together with the cohesive. In at least one embodiment according to the present disclosure, the top sheet further comprises a first strip embedded therein and the bottom sheet further comprises a second strip embedded therein, and wherein the first strip is oriented perpendicular to the second strip when the top sheet is bonded to the bottom sheet with the cohesive. In at least one embodiment according to the present disclosure, the top sheet further comprises at least two edges extending perpendicular to the corrugations of the top sheet and a third strip embedded therein, and the bottom sheet further comprises at least two edges extending perpendicular to the corrugations of the bottom sheet and a fourth strip embedded therein, and wherein the first strip and the third strip are disposed at or near opposite edges of the top sheet, and the second strip and fourth strip are disposed at or near opposite edges of the bottom sheet when the top sheet is bonded to the bottom sheet with the cohesive.

In at least one embodiment according to the present disclosure, the system further includes a first tray configured to accept an article, the first tray comprising a first blister volume and a first flange and disposed within a first opening formed through the top sheet, whereby the first blister volume protrudes through the first opening when the first flange contacts the top interior surface of the top sheet, wherein the first flange is trapped between the top interior surface and the bottom interior surface when the top sheet is bonded to the bottom sheet. In at least one embodiment according to the present disclosure, the system further includes a second tray configured to accept an article, the second tray comprising a second blister volume and a second flange and disposed within a second opening formed through the bottom sheet, whereby the second blister volume protrudes through the second opening when the second flange contacts the bottom interior surface of the bottom sheet, wherein the second flange is trapped between the top interior surface and the bottom interior surface when the top sheet is bonded to the bottom sheet.

In at least one embodiment according to the present disclosure, the cohesive is applied to the top cohesive region and the bottom cohesive region by a modified flexographic printing apparatus. In at least one embodiment according to the present disclosure, the top cohesive region is substantially coextensive the bottom cohesive region. In at least one embodiment according to the present disclosure, the pressure applied to bond the top sheet to the bottom sheet is at least 10,000 pounds per square inch.

In at least one embodiment according to the present disclosure, a cold seal cohesive packaging system includes a top sheet having a top interior surface, an opposing top exterior surface, at least one top cohesive region defined on the top interior surface, and a first opening formed therethrough, the top sheet comprising a corrugated fiberboard having corrugations aligned in a direction and at least one strip embedded therein and disposed transversely to the direction of the corrugations; a bottom sheet having a bottom interior surface, an opposing bottom exterior surface, and at least one bottom cohesive region defined on the bottom interior surface, the bottom sheet comprising a corrugated fiberboard having corrugations aligned in a direction and at least one strip embedded therein and disposed transversely to the direction of the corrugations, wherein the corrugations and at least one strip of the top sheet are oriented perpendicular to the corrugations and at least one strip of the bottom sheet; a first tray configured to accept an article, the tray comprising a first blister volume and a first flange and disposed within the first opening through the top sheet such that the first blister volume protrudes through the first opening when the first flange contacts the top interior surface of the top sheet; and a cohesive, wherein the cohesive is applied in liquid form and adheres as a film to the at least one top cohesive region and the at least one bottom cohesive region, and wherein the cohesive is capable of permanently bonding the top sheet to the bottom sheet when the at least one top cohesive region at least partially contacts the at least one bottom cohesive region and a pressure is applied substantially simultaneously to both the top exterior surface opposite the at least one top cohesive region and the bottom exterior surface opposite the at least one bottom cohesive region, whereby the flange of the tray is trapped between the top interior surface and the bottom interior surface when the top sheet is bonded to the bottom sheet, and wherein the cohesive comprises a latex-based cohesive with a viscosity of no more than 450 centipoise, which once dried is cohesive only to itself and lacks tackiness.

In at least one embodiment according to the present disclosure, the at least one strip embedded in the top sheet and the at least one strip embedded in the bottom sheet are formed of a tear resistant material. In at least one embodiment according to the present disclosure, the at least one strip embedded in the top sheet is disposed adjacent an edge of the top sheet, and the at least one strip embedded in the bottom sheet is disposed adjacent an edge of the bottom sheet. In at least one embodiment according to the present disclosure, the top sheet further includes at least two edges extending perpendicular to the corrugations of the top sheet and a first strip and a third strip embedded therein, and the bottom sheet further comprising at least two edges extending perpendicular to the corrugations of the bottom sheet and a second strip and a fourth strip embedded therein, and wherein the first strip and the third strip are disposed at or near opposite edges of the top sheet, and the second strip and fourth strip are disposed at or near opposite edges of the bottom sheet when the top sheet is bonded to the bottom sheet with the cohesive. In at least one embodiment according to the present disclosure, the top cohesive region is substantially coextensive the bottom cohesive region when the top sheet is bonded to the bottom sheet.

In at least one embodiment according to the present disclosure, the system further includes a second tray configured to accept an article, the second tray comprising a second blister volume and a second flange and disposed within a second opening formed through the bottom sheet, whereby the second blister volume protrudes through the second opening when the second flange contacts the bottom interior surface of the bottom sheet, wherein the second flange is trapped between the top interior surface and the bottom interior surface when the top sheet is bonded to the bottom sheet. In at least one embodiment according to the present disclosure, the pressure applied to bond the top sheet to the bottom sheet is at least 10,000 pounds per square inch.

BRIEF DESCRIPTION OF THE DRAWINGS

The described embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

Like reference numerals indicate the same or similar parts throughout the several figures.

An overview of the features, functions and configuration of the components depicted in the various figures will now be presented. It should be appreciated that not all of the features of the components of the figures are necessarily described. Some of these non-discussed features, such as various couplers, etc., as well as discussed features are inherent from the figures. Other non-discussed features may be inherent in component geometry or configuration.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The disclosure of the present application provides a cold cohesive packaging system using tear resistant tape. A cold cohesive packaging system may be constructed of a plastic blister pack, a corrugated fiberboard enclosure, a tear resistant tape embedded in the corrugated fiberboard, and a unique cold cohesive adhesive and application process, which results in a container that is strong, tamper-proof, and recyclable and can be produced at a much faster rate than conventional product packaging. Though the cold cohesive packaging system may be commonly used with retail consumer products, it will be appreciated that the cohesive packaging system is not limited to use with these specific types of products or distribution outlets and, consequently, may be used to package any article or articles.

Figure 1:
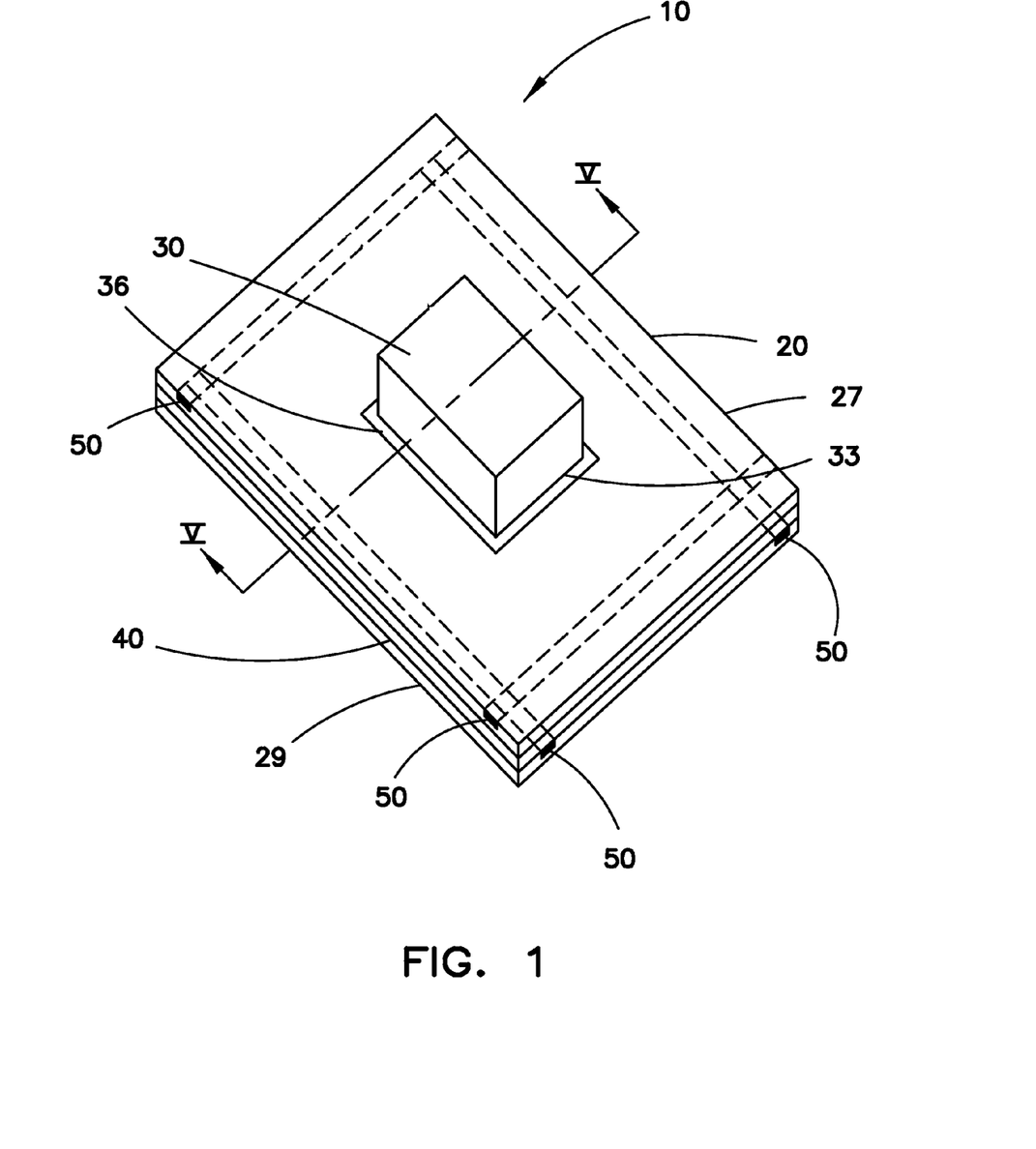
FIG. 1 shows a cold cohesive packaging system according to the present disclosure.

FIG. 1 shows a cold cohesive packaging system according to the present disclosure. As shown in FIG. 1, the cohesive packaging system 10 includes a housing 20, which encloses and retains a product tray 30 and is sealed with a cold cohesive 40. The packaging system 10 is configured to enclose one or more articles (not shown), such as consumer products, within the tray 30 and to protect products from damage, blemish, or theft. To adequately protect the products, the cohesive 40 must permanently seal the housing 20 around the edges of tray 30 with sufficient strength and durability to securely support the products' weight during shipping, handling, and display of the product and to discourage tampering with the packaging system 10 and its contents by a potential shoplifter.

Figure 5:
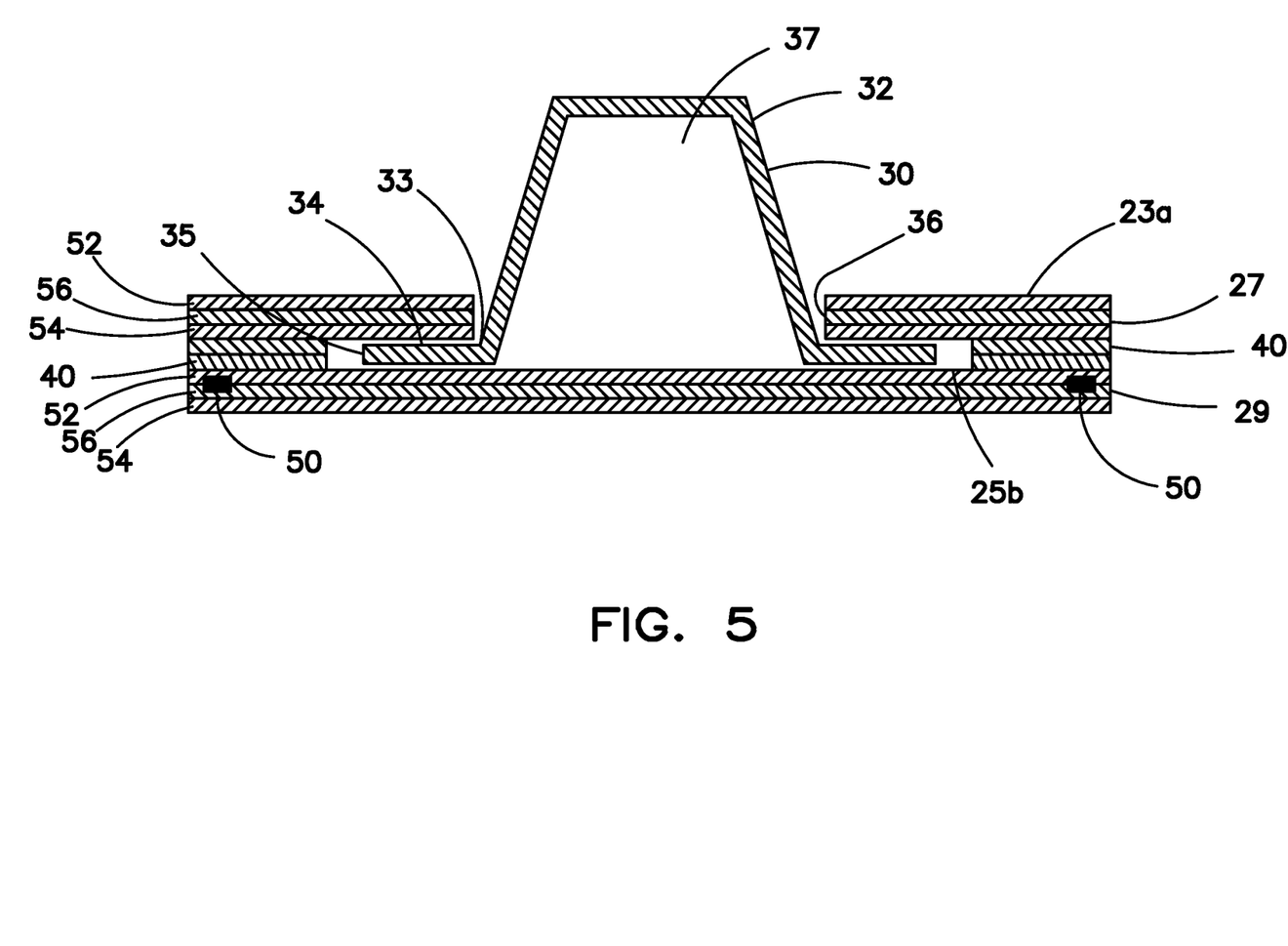
FIG. 5 shows a cross-sectional view of a housing for a cohesive packaging system according to the present disclosure, taken along line V-V of FIG. 1.

In at least one embodiment of a cohesive packaging system according to the present disclosure, the tray 30 includes a blister portion 32 and a flange portion 34 as shown in FIG. 5. The blister portion 32 is formed to define a product volume 37 and a blister perimeter 33 appropriately sized to accept and conform to a specific product to be packaged within the packaging system 10. The flange portion 34 extends in a plane from the blister perimeter 33 and defines a flange perimeter 35. The flange portion 34 enables the tray 30 to be trapped within the housing 20 and enables the blister portion 32 to project through an opening 36 formed in the housing 20, as disclosed further herein. In at least one embodiment of the present disclosure as shown in FIGS. 1 and 5, the opening 36 in housing 20 is formed to be the same as or slightly larger than the blister perimeter 33 but substantially smaller than the flange perimeter 35, further enabling secure handling and display of the product within packaging system 10. It will be appreciated that the width of the flange portion 34 may vary with the size and weight of the product to be secured within the packaging system 10. Larger and heavier products may generally require a wider flange portion 34 to adequately distribute the weight of the product to the housing 20 and to securely retain the flange portion 34 within the housing 20.

The tray 30 may be made of any material suitable for secure shipping, handling, and display of the product within the packaging system 10. Exemplary materials may include clear plastic materials, such as polyethylene terephthalate, that can be molded or thermoformed into a shape generally conforming to the product to be secured within the packaging system 10.

Figure 2:
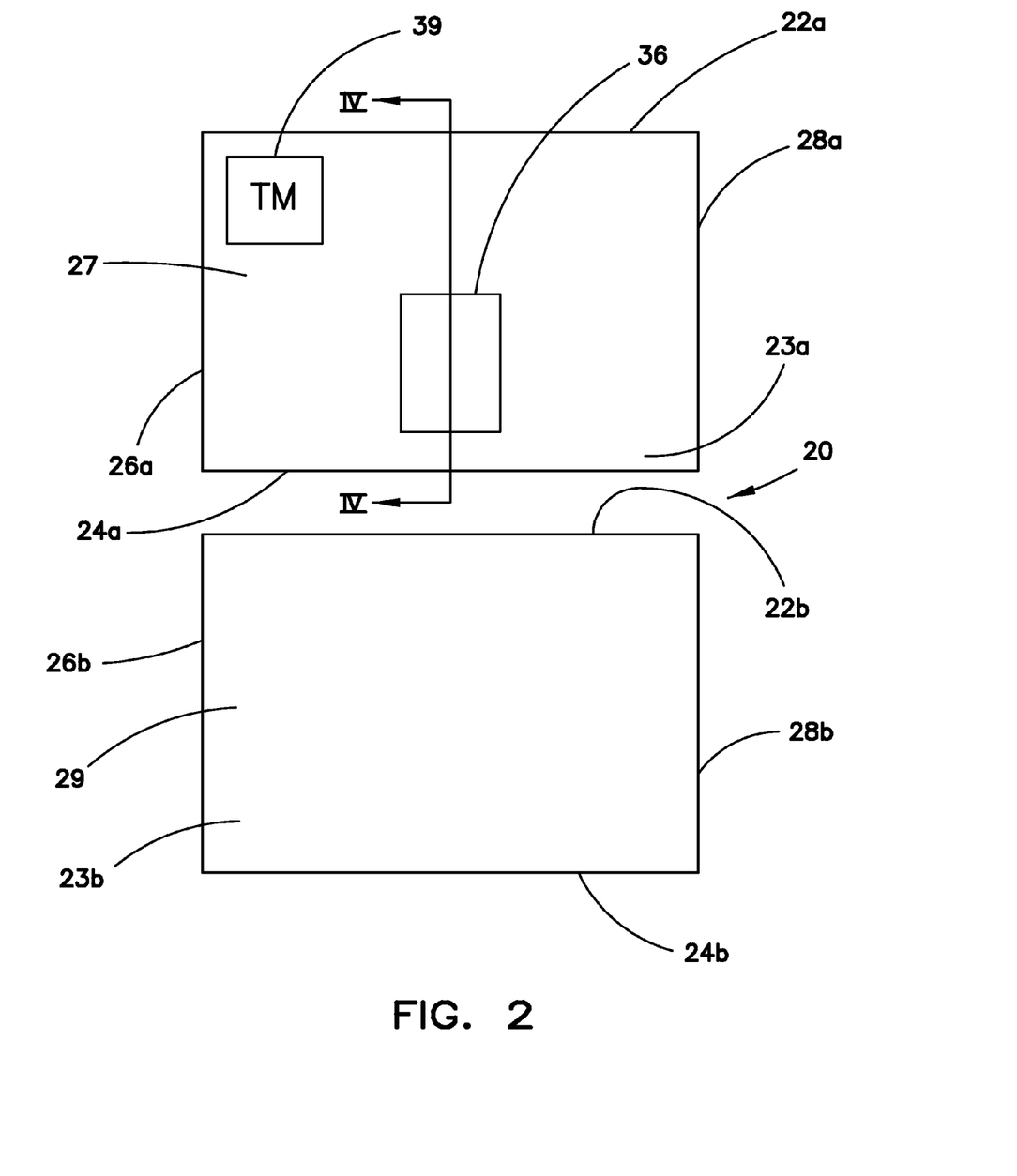
FIG. 2 shows a housing for a cohesive packaging system according to the present disclosure.
Figure 3:
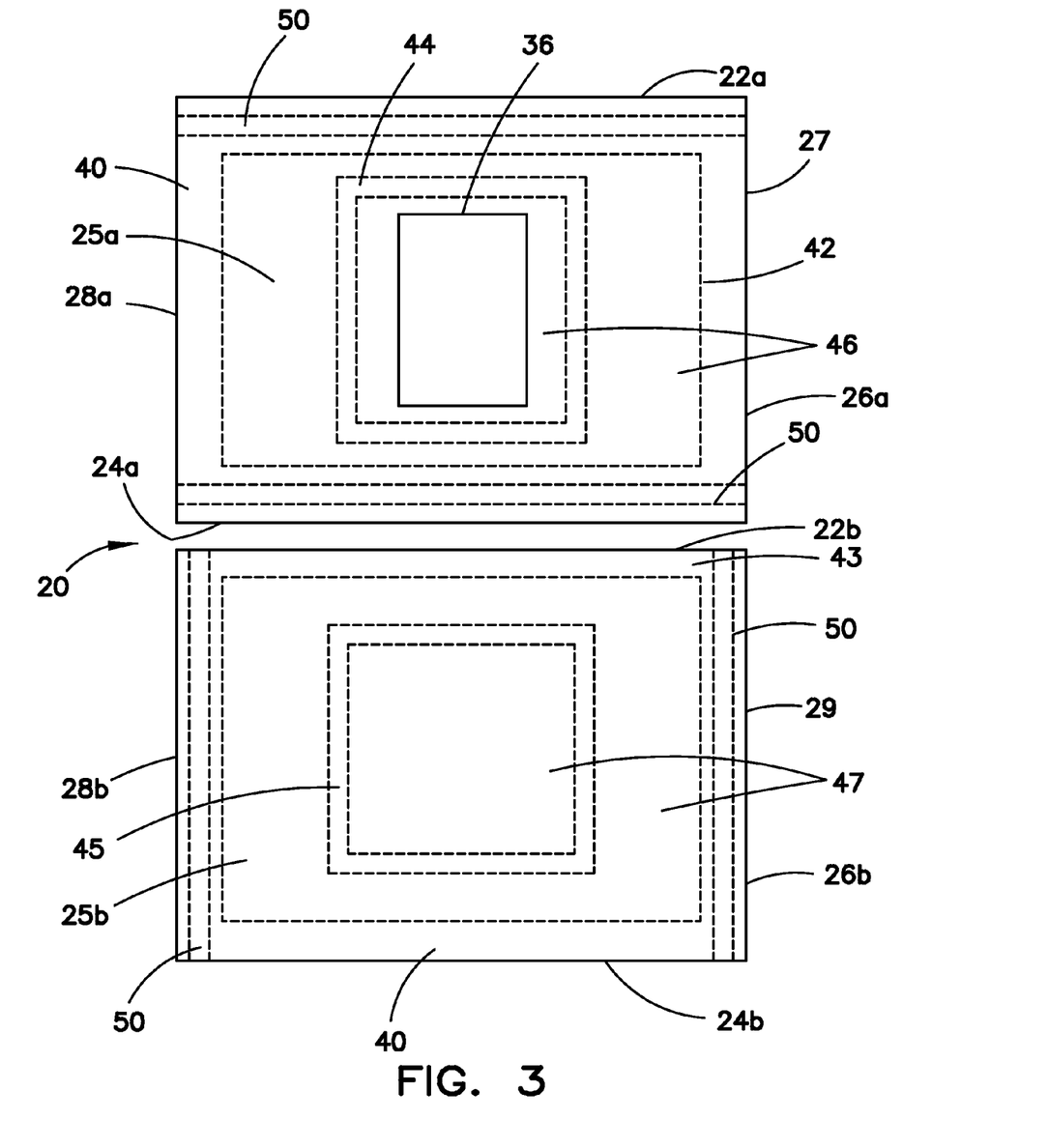
FIG. 3 shows a housing for a cohesive packaging system according to the present disclosure.

Referring to FIGS. 2 and 3, in at least one embodiment according to the present disclosure, the housing 20 includes a top sheet 27 and a bottom sheet 29. The top sheet 27 is bounded by a leading edge 22a, trailing edge 24a, a first edge 26a, and a second edge 28a and includes an exterior surface 23a and an opposing interior surface 25a, as shown in FIG. 3. The bottom sheet 29 is bounded by a leading edge 22b, trailing edge 24b, a first edge 26b, and second edge 28b and includes an exterior surface 23b and an opposing interior surface 25b, as shown in FIG. 3. When assembled together to form the housing 20, the interior surface 25a of the top sheet 27 contacts the interior surface 25b of the bottom sheet 29.

According to at least one embodiment of a product packaging container according to the present disclosure, the top sheet 27 may include at least one opening 36 formed through the exterior and interior surfaces 23a, 25a. As shown in FIG. 1, the opening 36 may be formed to accept the tray 30, whereby a suitable inner perimeter shape is formed as disclosed in more detail herein. Alternatively, though the opening 36 is depicted as being formed through the top sheet 27, the housing 20 may include one or more additional openings 36 formed in either the top sheet 27 or the bottom sheet 29. Further, the exterior surfaces 23a, 23b may include graphic indicia 39 identifying or advertising the product contained within packaging system 10, or displaying regulatory nutrition information, a universal product code or matrix barcode, or any other information relevant to the product. The indicia 39 may be printed on the exterior surfaces 23a, 23b by a suitable process or may be applied as a label to the exterior surfaces 23a, 23b.

The top sheet 27 and bottom sheet 29 of the housing 20 may be formed of corrugated fiberboard, such as E flute corrugated fiberboard, paperboard, cardboard, chipboard, corrugated plastic board, or any planar material suitable for the requirements of a packaging system 10 as disclosed herein. The packaging system 10 may also be made using numerous other substrates for housing 20, such as 32 ECT E-flute, 32 ECT B-Flute, 200 lb test B-flute, and various microflutes (N&F), etc. Embodiments described herein we are not limited to corrugated cardboard, as conventional packages use corrugated cardboard for both "sheets" of their housing. Embodiments described herein may use virtually any paperboard substrate in any combination. For example, embodiments may use an E-flute backer card with a SBS or chipboard front card to form a housing 20 for package container 10. Approximately 20% of the marketplace uses corrugated/corrugated sheet combinations, whereas the remaining 80% of the marketplace uses either chipboard/SBS or some combination of chipboard/SBS and corrugated. Embodiments described herein may be used with more varieties of materials than conventional packaging provides.

Figure 4:
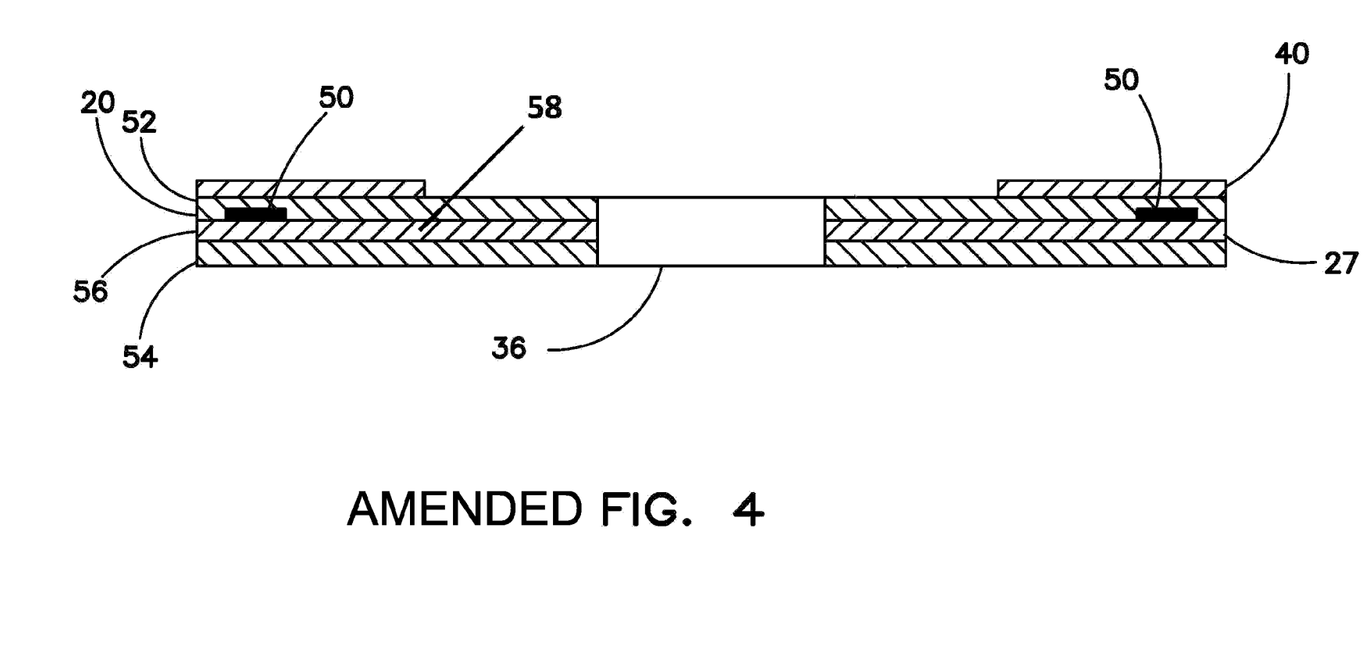
FIG. 4 shows a cross-sectional view of a housing for a cohesive packaging system according to the present disclosure, taken along line IV-IV of FIG. 2.

In at least one embodiment according to the present disclosure as shown in FIG. 4, the top sheet 27 and bottom sheet 29 each may be formed of a corrugated material having a first layer 52 and a second layer 54 with a corrugated layer 56 disposed therebetween. The corrugated layer 56 may include a plurality of flutes 58, which alternately contact the first and second layers 52, 54. As is known in the art, the layers 52, 54, 56 may be bound together with a conventional adhesive. In at least one embodiment of the present disclosure, the top sheet 27 and bottom sheet 29 may each further include at least one strip 50 embedded between the corrugated layer 56 and either the first layer 52 or the second layer 54. Moreover, the at least one strip 50 may be oriented transversely to the flutes 58 of the corrugated layer 56 as shown in FIG. 4 to provide strength and tear resistance in the direction transverse to the flutes 58.

As shown in FIGS. 1 and 3, the at least one strip 50 may be disposed adjacent the leading edge 22a of the top sheet 27. The at least one strip 50 may further be disposed adjacent the trailing edge 24a of the top sheet 27. Likewise, the at least one strip 50 may be disposed adjacent the first edge 26b of the bottom sheet 29, and the at least one strip 50 may further be disposed adjacent the second edge 28b. In at least one embodiment of the present disclosure as shown in FIGS. 1 and 3, the strips 50 of the top sheet 27 and bottom sheet 29 may be oriented perpendicular to one another when assembled to form the housing 20, whereby the strips 50 border the entire periphery of the housing 20. In at least one embodiment of the present disclosure, top sheet 27 may be formed from the same stock corrugated material as the bottom sheet 29 but may be rotated 90-degrees to orient the strips 50 in the perpendicular configuration shown in FIGS. 1 and 3. It will be appreciated that, though the housing 20 is shown with a rectangular shape, the perimeter of the top sheet 27 and bottom sheet 29 could form any desired shape and size.

The at least one strip 50 may be a tear resistant tape such as, but without limitation, reinforced fiber tape formed of polyethylene, such as low density polyethylene (LDPE), high density polyethylene (HDPE), very low density polyethylene (VLLDPE), ultra low density polyethylene (ULLDPE), polypropylene, polyester, polyolefin, or other suitably tough material. Because it is tear resistant, the at least one strip 50 may prevent the housing 20 from being torn open by hand by a potential shoplifter to gain access to the tray 30 and the products contained therein. In embodiments in which the strip 50 is embedded in the top sheet 27 adjacent both the leading edge 22a and trailing edge 24a and is embedded in the bottom sheet 29 adjacent both the first edge 26b and the second edge 28b, the packaging system 10 is protected from torn open by hand along all sides. In such an embodiment, a tool such as scissors or a knife is needed to open the housing 20 and access the products within the tray 30.

As discussed herein, cohesive 40 bonds top sheet 27 to bottom sheet 29 and seals product tray 30 within cohesive packaging system 10. Cold cohesive 40 is a quick-drying, latex-based adhesive that, once dried, will create a no-tack surface and will only adhere to other surfaces coated with the same cohesive when placed under high pressure. Accordingly, the cohesive 40 may be applied in specific cohesive regions on the interior surfaces 25a, 25b of the top sheet 27 and bottom sheet 29, respectively. In the embodiment shown in FIG. 3, cohesive 40 is applied to interior surface 25a along a perimeter region of the top sheet 27 within a top cohesive region 42 and along a perimeter region surrounding the opening 36 within a top product cohesive region 44 of the top sheet 27. Because the cohesive 40 only adheres to itself, any cohesive region located on the top sheet 27 of housing 20 may have a corresponding cohesive region on the bottom sheet 29. Accordingly, cohesive 40 may be further applied to interior surface 25b along a perimeter region of the bottom sheet 29 to a bottom cohesive region 43 and a bottom product cohesive region 45 of the bottom sheet 29. The cohesive regions 42, 43, 44, 45 are configured such that, when the top sheet 27 is assembled to the bottom sheet 29, the cohesive 40 in the top cohesive region 42 will bond with the cohesive 40 in the bottom cohesive region 43, and the cohesive 40 in the top product cohesive region 44 will bond with the cohesive 40 in the bottom product cohesive region 45. Due to the unique properties of cohesive 40, secure bonding of the cohesive regions 42, 43, 44, 45 is only achieved when a high pressure of at least 10,000 pounds per square inch (psi) has been applied to the cohesive-cohesive interface by a cold seal compressor or other suitable sealing device.

As shown in FIGS. 3 and 4, the top cohesive region 42 may extend from the edges 22a, 24a, 26a, and 28a toward the center of the interior surface 25a but may not extend as far as the opening 36 as to avoid contact between the cohesive 40 and the tray 30 in assembly. In at least one embodiment of the present disclosure, the width of the top cohesive region 42 and bottom cohesive region 43 extend no more than 12.9 millimeters (0.5 inches) toward the center of the interior surface 25a. Applying the cohesive 40 in the narrow upper and lower cohesive regions 42, 43 prevents any contact between the cohesive 40 and the tray 30, which facilitates recyclability of the packaging system 10 by enabling easy separation of the tray 30 from the housing 20 without leaving contaminating cohesive 40 on the tray 30. Further, to facilitate recyclability of the packaging system 10, the top and bottom product cohesive regions 44, 45 may be positioned so as not to contact the tray 30.

In at least one embodiment according to the present disclosure, the housing 20 may not include the top product cohesive region 44 or the bottom product cohesive region 45. Alternatively, the housing 20 may include any number of cohesive regions separated from the top cohesive region 42 or bottom cohesive region 43 by at least one region without cohesive 40. In at least one embodiment, the top sheet 27 may include at least one top uncoated region 46, and the bottom sheet 29 may include at least one bottom uncoated region 47.

In at least one embodiment according to the present disclosure, the at least one strip 50 may be located within the boundaries of the top cohesive region 42 across at least one top uncoated region 46 and may extend beyond the first edge 26a or the second edge 28a of the top sheet 27. In such an embodiment, the strip 50 may enable a user to tear open the packaging system 10 by hand by pulling the portion of the strip 50 that extends beyond the top sheet 27 through the exterior surface 23a, thereby exposing the uncoated region 46 and providing access to the tray 30. Likewise, in at least one embodiment, the at least one strip 50 may be located within the boundaries of the bottom cohesive region 43 across at least one bottom uncoated region 47 and may extend beyond the first edge 26b or the second edge 28b of the top sheet 29. In such an embodiment, the strip 50 may enable a user to tear open the packaging system 10 by hand by pulling the portion of the strip 50 that extends beyond the top sheet 29 through the exterior surface 23b, thereby exposing the uncoated region 47 and providing access to the tray 30.

In addition to facilitating recyclability of packaging system 10, the total area of the interior surfaces 25a, 25b occupied by the cohesive regions 42, 43, 44, 45 may be reduced to minimize the amount of cohesive 40 included in the packaging system 10. Minimizing the cohesive regions 42, 43, 44, 45 reduces the cost of packaging system 10 by both reducing the amount of materials used and increasing the rate of production of the housing 20. Nonetheless, a sufficient amount of cohesive 40 must be used to ensure the top sheet 27 and bottom sheet 29 of housing 20 are bonded together with sufficient strength and durability as required for a specific packaging system 10 as disclosed herein.

Figure 6:
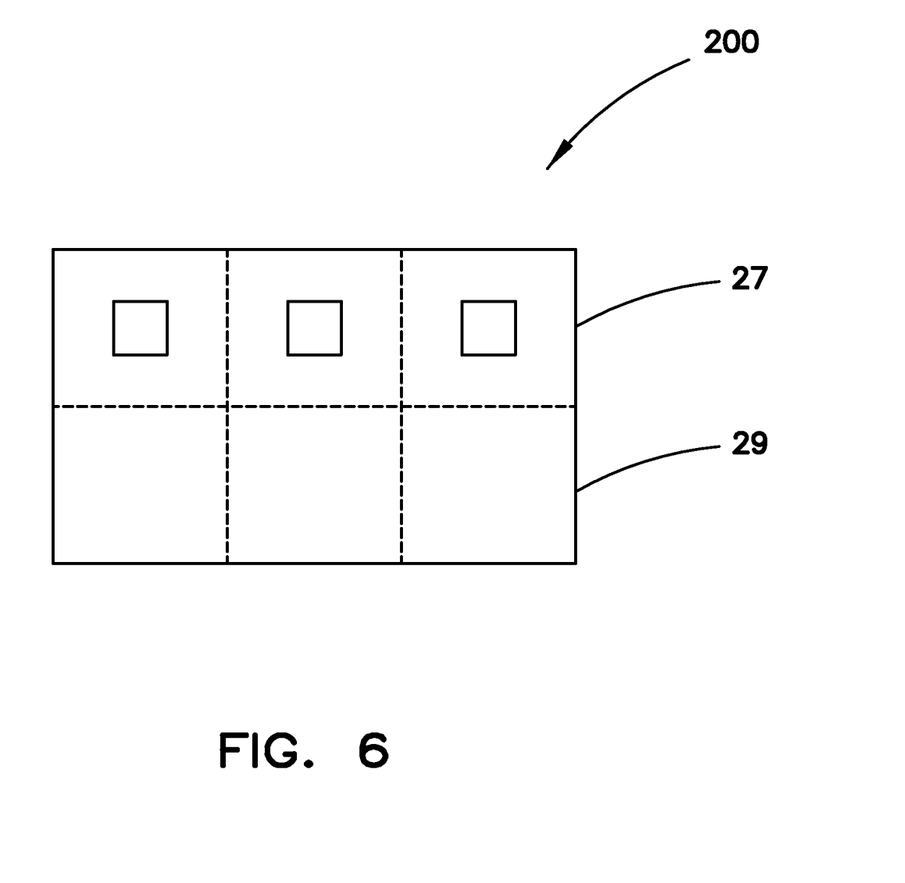
FIG. 6 shows a housing web for a cohesive packaging system according to the present disclosure.

Because cohesive 40 dries quickly and is only applied to the interior surfaces 25a, 25b of the housing 20, the use of cohesive 40 allows multiple housings to be stacked on top of one another during the manufacturing process, as the coated interior surface 25a of one top sheet 27 will not adhere to the exterior surface 23a of another top sheet 27, for instance. The ability to stack coated housings 20 greatly improves the manufacturing process as compared to prior art processes using conventional adhesives in which the adhesives were slow to dry and were susceptible to smearing when coming into contact with the other surfaces. Prior art manufacturing processes using conventional cohesives were also limited in the number of housings that could be stacked together, as each accumulation of weight in a stack of housings increased the possibility of the housings adhering to each other. Often housings must be transported standing on end instead of lying flat to avoid adhering the housings together (i.e., blocking); however, the housings are susceptible to damage when transported this way. Unlike conventional packaging using contact cohesives, the housings 20 produced by the cohesive application method of the present disclosure may be handled, stacked, stored, and transported in economically efficient quantities without sticking together because of the lack of surface tack achieved and the rapid drying process. The properties and application of cohesive 40 also enable the cohesive 40 to be applied prior to die cutting the opening 36 or cutting a sheet of corrugated material 200 into separate top sheets 27 and bottom sheets 29, as shown in FIG. 6. Consequently, a sheet may pass through the cohesive application process without cohesive 40 smearing or leaving residue on the process machinery.

The cold cohesive 40 is specially formulated to provide that characteristics described herein. The cold cohesive 40 is an emulsion of natural and/or synthetic latex rubber in aqueous solution of ammoniated water with a solids content between 15 and 65 percent by weight. The viscosity of the cohesive 40 may be between 10 and 450 centipoise (cP) at 20 revolutions per minute and 23 degrees Celsius (° C.) per ASTM D1084 Test Method B. Further, the density of cohesive 40 may be between 8.0 and 9.0 pounds per gallon (lb/gal) at 25° C., and the basicity or pH may be between 9.5 and 12 pH. The composition of cohesive 40 may contain dispersants, surfactants, tackifiers, isocyanates, and antifoaming agents, as is known in the art, without deviating from the scope of the disclosure. In at least one embodiment of the present disclosure, cohesive 40 has the following properties: the solids content is 57.5 percent by weight, the viscosity is 75 cP at 25° C., the density is 8.3 lb/gal, and the pH is 10.0. In at least one embodiment of the present disclosure, the cohesive 40 has a solids content between 45 and 58 percent by weight, a viscosity between 75 and 200 cP at 23° C., a density between 8.3 and 8.7 lb/gal at ° C., and a basicity between 10 and 11 pH. Viscosity may be measured using ASTM D1084 Test Method B using the Brookfield viscometer or ASTM D1084 Method D using Zahn Cups.

Being a latex-based cohesive, the viscosity of the cold cohesive 40 increases dramatically under processing conditions that induce shear stress in the cohesive 40, causing shear thickening or agglomeration. Likewise, the cohesive 40 exhibits high shear viscosity, which is a measure of resistance to flow at the high shear rates imposed by the application process. However, to reduce shear sensitivity, the cohesive 40 has significantly lower viscosity and solids content than conventional cohesive adhesives used in the product packaging art. Further, the low viscosity and solid content enable the cohesive 40 to be applied and effective at a film thickness between 0.007-0.002 in. and typically 0.0015 in. Nonetheless, various processing issues must be overcome to prevent inducing shear stress in the cohesive 40 and achieve the noted film thickness range during application at high production rates.

Traditionally, high speed printing press processes, for example, flexographic printing, are anticipated to induce shear stresses in a material used for printing, generally inks, on a substrate. Because inks are generally not adversely affected by the levels of shear stress induced by the these processes, operators have not had a need to modify their high speed printing press processes to reduce the shear stresses induced. However, some adhesive materials, such as the cold cohesive 40, are sensitive to shear as described above. Consequently, conventional high speed printing processes are not capable of applying the cold cohesive 40 without inducing the shear stress responsible for agglomeration of the cohesive. As a result, various modifications must be made to a conventional flexographic printing press to enable continuous, high speed application of the cohesive 40, as disclosed herein. In total, the cohesive 40 enables production rates not possible using conventional packaging adhesives. For example, the cohesive 40 may be applied at a production rate of 3,300 feet per minute (ft/min), compared to 45 ft/min for conventional application processes and adhesives. Further, the cohesive 40 may be applied prior to a die cutting operation, unlike conventional adhesives, thereby allowing the die cutting operation to be included within the application process and provide additional production efficiencies.

Another processing issue related to the composition and application film thickness of the cohesive 40 is the sealing process. As described above, while the cold cohesive 40 exhibits cohesive characteristics, the cohesive characteristics of the cohesive 40 are not highly pressure sensitive, meaning significant pressure must be applied to the substrate to be bound to initiate cohesion of the cohesive 40. As a result, the cohesive 40 has essentially no tack, to itself or uncoated surfaces or substrates, under common handling and processing conditions, which enables economic shipping and handling of unassembled housing 20 as disclosed herein. Consequently, due to the reduced pressure sensitivity and thin film thickness of the cohesive 40, conventional product packaging sealing processes used for conventional cohesive adhesives are not adequate to create a satisfactory bond between two surfaces coated with the cold cohesive 40. To produce a satisfactory cohesive bond between two surfaces coated with the cohesive 40, a sealing pressure of more than 10,000 pounds per square inch (psi), and typically about 19,000 psi, must be applied to the surfaces to be sealed.

Cold cohesive 40 is preferably applied to the interior surfaces 25a, 25b of housing 20 by a modified flexographic printing process that uses a flexible relief die to control application of and minimize induced shear stress in the cohesive 40. This may include using a set of cylindrical rollers, positioned adjacent to each other, which rotate relative to one another and are capable of metering, transferring and printing cohesive 40 on the top sheet 27 and the bottom sheet 29. Those of ordinary skill in the art may recognize other machinery to effectively apply the cohesive 40. Once the cohesive 40 has quickly dried, the cohesive regions in the top sheet 27 and bottom sheet 29 will only bond to each other upon the application of high pressure from a cold seal compressor or other suitable sealing device capable of applying 10,000 psi. Since the cohesive 40 is only applied to a limited number of cohesive regions, only those regions need to be sealed rather than the entire surface as in prior art packaging. Limiting the application of the cohesive 40 to specific cohesive regions not only reduces the amount of cohesive 40 needed for each packaging system 10 but also enables the cohesive 40 to be applied so that it is not in direct proximity to the product being packaged.

While various embodiments of cold cohesive packaging system and methods for making the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure and are intended to encompass any later appended claims. Indeed, this disclosure is not intended to be exhaustive or to limit the scope of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

We claim:

1. A cold seal cohesive packaging system, the system comprising:
   a top sheet having a top interior surface, an opposing top exterior surface, and at least one top cohesive region defined on the top interior surface;
   a bottom sheet having a bottom interior surface, an opposing bottom exterior surface, and at least one bottom cohesive region defined on the bottom interior surface; and
   a latex-based cohesive film on each of the at least one top cohesive region and the at least one bottom cohesive region having a thickness between 0.007 and 0.0015 inches, wherein the latex-based cohesive film comprises a latex based cohesive in liquid form having a viscosity between 10 and 450 centipoise at 20 revolutions per minute, a density between 8.0 and 9.0 pounds per gallon (lb/gal) at 25° C., a pH between 9.5 and 12, and 23 degrees Celsius, and a solids content between 15 and 65 percent by weight,
   wherein the latex-based cohesive is capable of permanently bonding the top sheet to the bottom sheet by the latex-based cohesive film when the at least one top cohesive region at least partially contacts the at least one bottom cohesive region and a pressure is applied substantially simultaneously to both the top exterior surface opposite the at least one top cohesive region and to the bottom exterior surface opposite the at least one bottom cohesive region, and
   wherein the latex-based cohesive has a low pressure sensitivity that requires the applied pressure to be at least 10,000 pounds per square inch to bond the cohesive applied on the at least one bottom cohesive region with the cohesive applied on the at least one top cohesive region, and which once dried is cohesive only to itself and is lacks tackiness.

2. The system of claim 1, further comprising at least one strip embedded in the top sheet or the bottom sheet, the at least one strip being resistant to tearing.

3. The system of claim 2, wherein at least one strip is disposed adjacent an edge of the top sheet or an edge the bottom sheet.

4. The system of claim 1, wherein the top sheet further comprises a corrugated layer having corrugations, and at least one tear resistant strip extending transversely across the corrugations of the top sheet, wherein the bottom sheet further comprises a corrugated layer having corrugations, and at least one tear resistant strip extending transversely across the corrugations of the bottom sheet.

5. The system of claim 4, wherein the corrugations of the top sheet are oriented perpendicular to the corrugations of the bottom sheet when the top sheet and bottom sheet are bonded together with the cohesive.

6. The system of claim 1, wherein the top sheet further comprises a first strip embedded therein and the bottom sheet further comprises a second strip embedded therein, and
   wherein the first strip is oriented perpendicular to the second strip when the top sheet is bonded to the bottom sheet with the cohesive.

7. The system of claim 6, wherein the top sheet further comprises at least two edges and a third strip embedded therein, and the bottom sheet further comprises at least two edges and a fourth strip embedded therein, and
   wherein the first strip and the third strip are disposed at or near opposite edges of the top sheet, and the second strip and fourth strip are disposed at or near opposite edges of the bottom sheet when the top sheet is bonded to the bottom sheet with the cohesive.

8. The system of claim 1, further comprising a first tray configured to accept an article, the first tray comprising a first blister volume and a first flange and disposed within a first opening formed through the top sheet, whereby the first blister volume protrudes through the first opening when the first flange contacts the top interior surface of the top sheet,
   wherein the first flange is trapped between the top interior surface and the bottom interior surface when the top sheet is bonded to the bottom sheet.

9. The system of claim 1, wherein the top cohesive region is substantially coextensive the bottom cohesive region.

10. A cold seal cohesive packaging system, the system comprising:
    a top sheet having a top interior surface, an opposing top exterior surface, at least one top cohesive region defined on the top interior surface, and a first opening formed there through, the top sheet comprising a corrugated fiberboard having corrugations aligned in a direction and at least one strip embedded therein and disposed transversely to the direction of the corrugations;
    a bottom sheet having a bottom interior surface, an opposing bottom exterior surface, and at least one bottom cohesive region defined on the bottom interior surface, the bottom sheet comprising a corrugated fiberboard having corrugations aligned in a direction and at least one strip embedded therein and disposed transversely to the direction of the corrugations,
    wherein the corrugations of the top sheet are oriented perpendicular to the corrugations of the bottom sheet;
    a first tray configured to accept an article, the tray comprising a first blister volume and a first flange and disposed within the first opening through the top sheet such that the first blister volume protrudes through the first opening when the first flange contacts the top interior surface of the top sheet; and
    a latex-based cohesive film on each of the at least one top cohesive region and the at least one bottom cohesive region having a thickness between 0.007 and 0.0015 inches, wherein the latex-based cohesive film comprises a latex based cohesive in liquid form having a viscosity between 10 and 450 centipoise at 20 revolutions per minute, a density between 8.0 and 9.0 pounds per gallon (lb/gal) at 25° C., a pH between 9.5 and 12, and 23 degrees Celsius, and a solids content between 15 and 65 percent by weight, wherein the latex-based cohesive is capable of permanently bonding the top sheet to the bottom sheet by the latex-based cohesive film when the at least one top cohesive region at least partially contacts the at least one bottom cohesive region and a pressure is applied substantially simultaneously to both the top exterior surface opposite the at least one top cohesive region and the bottom exterior surface opposite the at least one bottom cohesive region, whereby the flange of the tray is trapped between the top interior surface and the bottom interior surface when the top sheet is bonded to the bottom sheet, and wherein the latex-based cohesive has a low pressure sensitivity that requires the applied pressure to be at least 10,000 pounds per square inch to bond the cohesive applied on the at least one bottom cohesive region with the cohesive applied on the at least one top cohesive region, and which once dried is cohesive only to itself and is lacks tackiness.

11. The system of claim 10, wherein the at least one strip embedded in the top sheet and the at least one strip embedded in the bottom sheet are formed of a tear resistant material.

12. The system of claim 10, wherein the at least one strip embedded in the top sheet is disposed adjacent an edge of the top sheet, and the at least one strip embedded in the bottom sheet is disposed adjacent an edge of the bottom sheet.

13. The system of claim 10, wherein the top sheet further comprising at least two edges extending perpendicular to the corrugations of the top sheet and wherein the at least one strip embedded therein is a first strip and a third strip, and the bottom sheet further comprising at least two edges extending perpendicular to the corrugations of the bottom sheet and wherein the at least one strip embedded therein is a second strip and a fourth strip, and wherein the first strip and the third strip are disposed at or near opposite edges of the top sheet, and the second strip and fourth strip are disposed at or near opposite edges of the bottom sheet when the top sheet is bonded to the bottom sheet with the cohesive.

14. The system of claim 10, wherein the top cohesive region is substantially coextensive the bottom cohesive region when the top sheet is bonded to the bottom sheet.

15. The system of claim 1, wherein the latex-based cohesive is an emulsion of natural and synthetic latex rubber in aqueous solution of ammoniated water.

* * * * *